F. L. SMILEY.
TOMATO KNIFE.
APPLICATION FILED SEPT. 21, 1908.
908,894.
Patented Jan. 5, 1909.
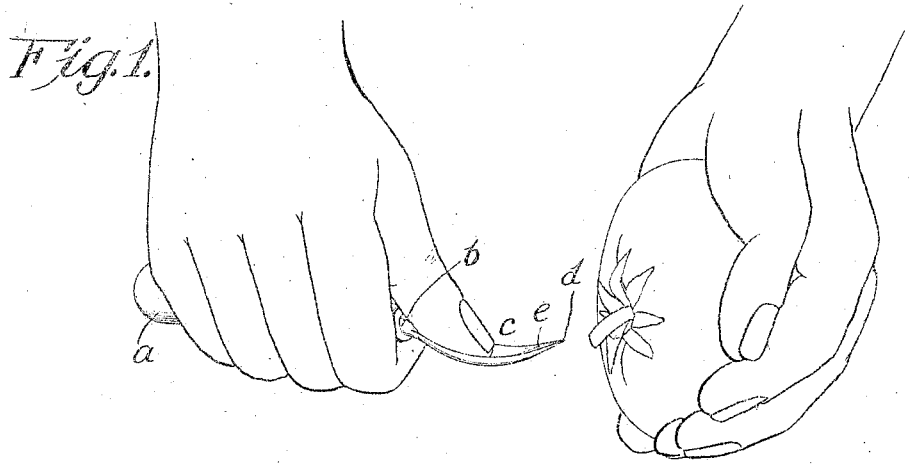
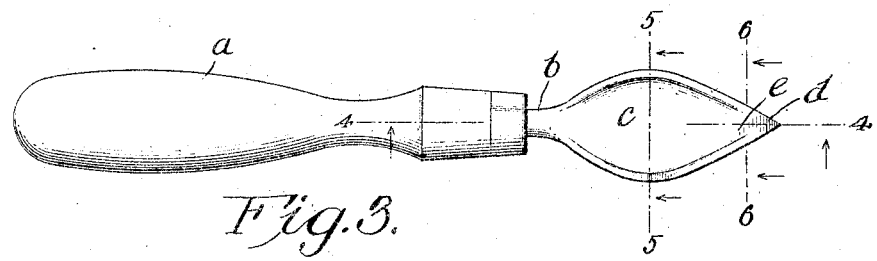
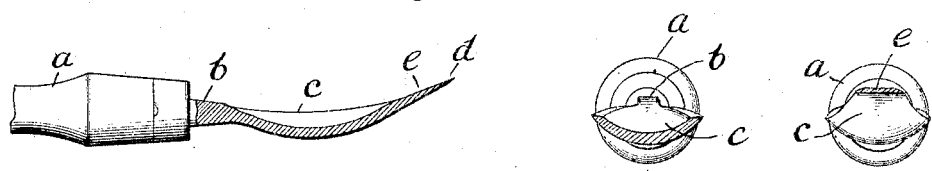
Witnesses
C. E. Smith.
Ernest C. Yost.
Inventor
F. L. Smiley
By Davis & Davis
Attorneys

UNITED STATES PATENT OFFICE.

FRANK LEADFORD SMILEY, OF BOTETOURT COUNTY, VIRGINIA.

TOMATO-KNIFE.

No. 908,894.  Specification of Letters Patent.  Patented Jan. 5, 1909.

Application filed September 21, 1908. Serial No. 454,097.

*To all whom it may concern:*

Be it known that I, FRANK LEADFORD SMILEY, a citizen of the United States of America, and a resident of the county of Botetourt and State of Virginia, have invented certain new and useful Improvements in Tomato-Knives, of which the following is a full and clear specification.

The object of this invention is to provide a simple and inexpensive knife-like implement for removing the stem and peel from tomatoes, as more fully hereinafter set forth.

In the accompanying drawings, Figure 1 is a perspective view showing the manner of using the tool; Fig. 2 is a side elevation of the tool; Fig. 3 is a plan view of the tool; Fig. 4 is a longitudinal sectional view thereof; and Figs. 5 and 6 are transverse sectional views taken respectively on the lines 5 and 6 of Fig. 3.

The device consists of a suitable handle $a$ in the end of which is rigidly fastened a shank $b$. Formed integral with the shank is a knife blade $c$ whose main portion is approximately spoon-shaped, that is, is dished transversely and longitudinally to form a convex under surface and a concave upper surface, the edges of the blade curving outwardly from the shank and forwardly to a pointed end $d$. Both side edges of the blade are sharpened. The forward portion of the blade is shaped differently from that of a spoon in that the portion $e$ is extended upwardly and outwardly from the main body portion of the blade with its side edges approximately straight. Said forward extension $e$ is approximately flat as compared with the main portion of the blade.

The manner of using the knife is shown in Fig. 1. The operator holds the vegetable in one hand and the knife in the other hand. He places his thumb in the concave or bowl portion of the blade. The curved portion of the blade is used to cut into and lift the edge of the peel; whereupon the free edge of the peel is clamped between the thumb and the blade and then pulled or peeled off. The upwardly projecting pointed extension of the blade is for the purpose of cutting out the stems and other portions of the vegetable that are to be discarded, the peculiar shape of this portion of the blade enabling this cutting out operation to be performed very expeditiously. By reason of the shape and the manner in which this extension $e$ extends upwardly from the body portion of the blade, the point may be readily worked around in the irregular stem cavity of the vegetable. The blade is double edged in order that it may be used by right-handed as well as by left-handed operators.

Having thus fully described my invention, what I claim as new, and desire to secure by Letters Patent, is:—

A knife for the purpose set forth, consisting of a handle, a shank portion, and a blade portion, the blade being approximately spoon-shaped and having both its edges curved and sharpened to cutting edges and its forward end portion extended forwardly from the main portion of the blade and upwardly therefrom, the cutting edges of this extended portion being straight and being brought to a sharp V-shaped point.

In testimony whereof I hereunto affix my signature in the presence of two witnesses this 18 day of September 1908.

FRANK LEADFORD SMILEY.

Witnesses:
FRANCE MONTGOMERY HAMMOND,
MARSHAL TAYLOR LUNSFORD.